United States Patent Office 3,468,698
Patented Sept. 23, 1969

3,468,698
PROCESS OF PRODUCING PIGMENT
COATED PAPER
Andre Joseph Pelletier and Garon C. Hayward, Chillicothe, Ohio, assignors to The Mead Corporation, Dayton, Ohio, a corporation of Ohio
No Drawing. Filed Jan. 5, 1965, Ser. No. 423,463
Int. Cl. B44d 1/14; C09c 1/36
U.S. Cl. 117—76                                4 Claims

ABSTRACT OF THE DISCLOSURE

Coated papers designed primarily for offset printing operations of improved strength, smoothness of the final coating surface, and other characteristics are obtained by applying a base coat comprising adhesive and pigments, at least 15% by weight (based on total dry solids) of which have an average particle size not substantially smaller than 2 microns average spherical diameter. This base coat is preferably covered with a final coating in which average pigment particle size is smaller than 2 microns average spherical diameter.

---

This invention relates to the production of coated paper and, more particularly, to an improved coated paper suitable for use in printing operations, as for example, offset printing and to an improved method of producing same.

Offset printing operations make a greater demand on the surface strength of the paper than do other types of printing operations. The requirement of greater surface strength of the paper is due to a number of factors which include (1) the use of high tack ink, which, after contacting the paper surface, does not easily split away from the paper, (2) the rubber blanket which transfers the image to be printed is deformable and makes intimate contact with the paper thus increasing the adhesion between the paper and the blanket, and (3) the water employed in connection with offset printing to maintain the non-printing areas tends to be picked up by the paper which tends to soften the coating and make it weak.

Prior art methods of producing coated offset papers have employed surface sizing, roll coaters, and other techniques involving the application of an adhesive at the wet end of the paper machine. Such techniques and methods have been employed to apply primer coats for the manufacture of a base stock to which a top coating is subsequently applied. While paper suitable for offset printing operations could be produced by these prior art techniques, the use of the primer coats involved several disadvantages in that they provided inadequate fibre coverage, required undesirably high adhesive levels and result in a relatively high drying load. In the case of surface sizing, the primer coats operated at low color solids and low coat weights, they contributed very little except for pick strength to the optical and other surface characteristics of the final coated sheet, and were expensive if altered in a way intended to minimize such disadvantages.

In addition, such prior art methods are subject to certain disadvantages which include defects in the resulting product due to foreign material being trapped between the paper and the coating means and those resulting from conditions inherent in the rawstock. Specific examples of such defects and particularly in connection with blade coating means include grit streaks, troweling streaks, show-through streaks, mottle resulting from inadequate fibre coverage, pittiness, etc.

Prior to the present invention, no coated offset papers were known to be commercially produced using a base coat applied by blade coating means. Attempts have been made to produce coated offset sheets using a base coat applied by such means but, prior to the present invention, very few of such attempts were satisfactory because of low pick strength. In such cases where the coated sheets were satisfactory on a pick strength basis, the sheets suffered in quality because the base coat color solids were very low, or coat weight was low, or an exceptionally strong raw stock obtained from a special furnish and/or paper machine operating conditions was required.

In producing offset papers according to the prior art methods, the primer or base coat was used to strengthen the raw stock beyond its inherent strength in order to avoid picking during offset printing. While the primer or base coat nearly always served its purpose of improving strength, this detracted from other desirable and necessary characteristics to a degree more or less dependent on the quality of the rawstock, the coating process used, and the final quality desired. Generally speaking, the poorer the rawstock furnish, the more base coat adhesive is needed to achieve the desired strength with the result that fibre coverage and optical properties are reduced, and the cost is increased. In accordance with the prior art practice, attempts to employ a blade coater instead of a roll coater resulted in even larger reductions in the above characteristics.

In the production of coated offset papers, the primer or base coat must develop bond strength. And in this connection, the problems concerning prior art blade base coating are at least two-fold. When color solids are sufficiently high to allow the proper coat weight to be applied, insufficient adhesive drainage takes place and thus insufficient improvement in raw stock strength results. When adhesive drainage is achieved through a reduction in color solids, bond strength may be developed but the advantages of the blade coater are greatly compromised or, the required coat weight cannot be applied and it is difficult to apply the coating uniformly.

Accordingly, an object of the present invention is to provide means for obviating such difficulties.

Another object is to provide an improved method for commercially producing coated paper of high quality and which is suitable for use in printing operations.

A further object is to provide an improved method for commercially producing coated paper having desired characteristics in the finished sheet including control of coat weight, good fibre coverage, high strength and a high degree of smoothness of the coating surface.

Still another object is to provide an improved method for commercially producing a coated paper product, which method is economical and well suited for high speed production and which is readily controllable to consistently obtain desired characteristics of the product produced thereby.

A further object is in the provision of an improved coated paper product having improved characteristics that meet the stringent requirements imposed by printing operations, and which are particularly difficult to meet in the case of offset printing.

In general, the invention involves the use of coarse pigments of various shapes, either alone, or in combination with each other, or in selected combinations with finer size pigments in coating compositions to be applied by known coating means as base coats and in combination, if desired, with subsequent top coats to produce a paper product of high quality.

As used herein, the term "coarse pigment" means that a particular pigment or pigments is or are large in size for its particular species as it would be recognized by one skilled in the art. The term "coarse pigment" is not to be limited to pigments in its narrowest meaning and, as used herein, it is intended to include the use of such pigment products as calcium carbonate, magnesium hydroxide, clays, Solka-Floc, ground polyethylene and dry starch. This is both necessary and possible in view of the very wide spectrum of formulations which can be coated with present coating technology. In general, the term "coarse pigments" are pigment materials having a particle size above 2 microns equivalent average spherical diameter.

Exemplary of the process of the present invention by which a high quality paper product is produced are the steps set forth below. A base coating was applied to one side of a standard coating rawstock by means of a blade coater. The blade coater was operated at a speed of 650 feet per minute and the blade metering pressure was adjusted to provide a coat weight of 6½ pounds per 3300 square feet pounds of solid materials of a coating composition prepared in accordance with the following base coat composition:

| | Percent |
|---|---|
| Clay | 23 |
| Calcium carbonate | 50 |
| Starch | 17 |
| Styrene-butadiene latex | 10 |

In the above composition, the particle size of the calcium carbonate particles was 7½ microns equivalent average spherical diameter and the coating composition was applied at a solids content of 51%.

Following the application of the coating composition to the rawstock, it was then dried to a moisture content of 5%. Thereafter, the opposite side of the rawstock was coated with the same color composition and procedure and dried in a like manner to obtain a base stock which was coated on both sides. The base coated material thus produced was then passed through one nip of a machine calendar to recondition the web to provide surface uniformity and to provide a web that is mechanically uniform.

The resulting base coated web was then passed through a blade coater operating at the same speed and adjusted to provide a coat weight of 9 pounds per 3300 square feet of solid materials of a top coating prepared in accordance with the following composition:

| | Percent |
|---|---|
| Clay | 50 |
| Calcium carbonate | 30 |
| Titanium dioxide | 6 |
| Soya protein | 6 |
| Styrene-butadiene latex | 8 |

The coat composition was applied at a solids content of about 60% solids. Following the application of the top coating composition, the web was dried to a moisture content of 5% and thereafter the opposite side of the web was again coated with the same top coat formulation and by the same procedure and again dried to about 5% total sheet moisture.

The base coated and top coated web thus produced was passed through a supercalender and subjected to the polishing effect of the supercalender rolls. The finished sheet was found to have excellent characteristics from a gloss standpoint, pick resistance, appearance and was free from blade coating defects.

Additional coarse pigments that have been found useful in the practice of the present invention include the following:

| Pigment | Average particle size (microns) | Trade name | Supplier |
|---|---|---|---|
| Calcium Carbonate. | 2.8 | Camel Wite | H. T. Campbell & Sons. |
| Do | 5 | Camel Tex | Do. |
| Do | 7.5 | Camel Carb | Do. |
| Clay | 5 | No Karb | Minerals & Chemicals. |
| Magnesium hydroxide. | 5 | MHT | Dow Chemical Co., Midland, Mich. |

Experiments have shown that the base coating compositions can be applied in accordance with the present invention by various known types of coating application means, including blade and roll coaters. In addition, particularly if it is desired to impart additional strength to the web, the web may be initially coated with a coating composition which may include either an adhesive or a combination of adhesives plus pigment prior to the application of the base coating containing the coarse pigments. The present invention provides many advantages which will be discussed as the description proceeds and are particularly advantageous where the base coat and the top coat are applied by blade coating means, the experiments have shown that some of these advantages can be obtained by a combination of other types of coating means. For example, the base coat and top coat may both be applied by blade coating means; the base coat may be applied by blade coater means and the top coating can be applied by means of spread shafts; the base coat may be applied by blade coater means and the top coating applied by air knife means; the base coat may be applied by roll coating means and the top coating applied by blade coating means.

In accordance with the present invention wherein coarse pigments are employed in the base coat composition, experiments have shown that the use of such coarse pigments in the base coating composition substantially improves fibre coverage particularly on rough, soaky, and mottled rawstock. In addition, the use of such pigments influences adhesive drainage and makes possible the control of adhesive migration from the base coat into the paper and from the top coat into the base coat thereby enabling better control of factors that are influenced by adhesive migration and which include ink absorption, paper gloss, pick strength and printability.

In addition, it has been found that the use of coarse pigments in the base coat composition enables a controlled texture or microroughness in the base stock which inherently reduces blade defects which frequently occur, especially at high coat weights in top coating applied by blade coating means. Additionally, experience has shown that the use of coarse pigments in the base coating composition enables the use of blade coating means for the application of the base coats which are found to be free of blade coating defects such as grit streaks, and the show-through of defects after subsequent top coating is eliminated. Additionally, the use of coarse pigments in the base coating composition provide better and proper adhesive drainage and lower adhesive demand. It has also been found that the use of coarse pigments in the base coating composition enables the base coating composition to be applied by means of a blade coater to produce base stocks for paper intended for use in printing operations where the stringent requirements of pick resistance must be met and is particularly useful in the production of offset grades.

With reference to providing sufficient bond strength and at the same time obtaining proper adhesive drainage, the incorporation of coarse pigments into the base coating in accordance with the present invention provides means for appreciably altering adhesive drainage with only minor effects in color solids while maintaining the proper degree of bond strength. Experiments have also shown that the use of coarse pigments in the base coating composition enhance the filling in effect of blade coating means and thus improve fibre coverage and also provide a texture to the sheet which will be discussed in greater detail hereinafter.

The improved fibre coverage resulting from the use of coarse pigments in the base coating composition had an acceptable pick strength both before and after top coating. In addition, whether the base coating composition was applied by roll or blade coating means, the use of the coarse pigments resulted in coatings that are superior in fibre coverage to those obtained with a base coating composition containing fine pigments. The improved fibre coverage is believed to result from the log jamming effect of the coarse pigments. Conventionally used fine pigments are postulated as falling into and coating the sides of pits in the cross section of the fibers in rawstocks leaving a substantial portion of the original void whereas the coarse pigments tend to fill these spaces because they jam or bridge across such voids.

In the production of high quality coated papers wherein a base coat is applied to rawstock by either roll or blade coating means and thereafter the base coating has applied thereto a top coating applied by blade coating means, experience has shown that the prior art processes are subject to certain limitations. For example, as noted heretofore, certain defects occur from time to time in the finished product and include those due to foreign material being trapped between the paper and the coating means, and those resulting from conditions inherent to the rawstock or base stock being coated and/or the color formulation employed. Specific examples of such difficulties and defects, particularly in connection with blade coating means, include grit streaks, troweling streaks, show-through streaks, mottle resulting from inadequate fibre coverage, pittiness, etc.

From the teachings of the prior art processes, it is known that the surface micro-smoothness of a base sheet that is to be blade coated should be textured, that is, micro-rough in order to achieve a higher coat weight and to reduce the coat weight variation by increasing the ratio of the coating applied by gravure metering to hydrodynamic metering; to improve overall coverage of the sheet; and to provide a surface that can absorb and/or assist in physically propelling a foreign particle through the blade/paper backup roll nip such that it does not lodge and cause streaks.

Several prior art means have been employed prior to the present invention to develop such texture. Some of such prior art means that have been employed include altering the degree of web pressing, breaker stack smoothing, or machine calendering of the rawstock or base stock; physically imparting a pattern to the rawstock by embossing; and altering the fibre furnish so as to have a different reaction to breaker stack smoothing or machine calendering or inherently due to the nature of the fibre. While such prior art methods have been generally effective, they have been aimed at producing the single effect of texturing, and have been subject to various difficulties which include varation in subject texture from point to point on the paper web, and pattern show-through after the top coating has been applied.

Experiments and experience have shown this texturing effect can be achieved more easily, uniformly and with additional benefits. Such additional benefits in addition to those noted heretofore and which include the provision of better fibre coverage, reduced adhesive demand of the particular coating in which the adhesive is used and also in subsequent top coating, provides better control of adhesive location in a particular coating, provides and/or assists either in achieving higher coat weight in a top coat and/or requires less top coat for a given quality level; in addition permits the use of a blade coater for applying the base coating in a two-stage coating process for the production of high quality printing paper and more particularly in the manufacture of offset grades.

Actual experience has verified the conclusions which were indicated on the basis of laboratory experience. Such conclusions include that, through proper selection of base coat pigments and color solids, base coats applied by blade coaters can be made to bond vessel segments and that a blade coater can be used to apply a base coat in any two-stage coating process utilized to manufacture high quality paper for printing purposes and particularly in connection with the manufacture of offset grades; the selection of a base coat pigment for base coating to be applied by blade coating means significantly affects the degree of fibre coverage achieved, the extent of adhesive migration, and the surface smoothness and porosity of the base sheet; base sheet texture is very significant regarding the degree of defects encountered with a top coating applied by blade coating means in that surface smoothness under blade pressure, as with printing impression, is an accurate measure of surface smoothness of a base stock; and the use of coarse pigment for base coatings applied either by roll or blade coating means, provides additional advantages for strength and fibre coverage over conventional base coat compositions which employ relatively fine pigments.

While the reason for the improved appearance of the finished paper product or freedom from defects as related to pigments, is not completely understood, it appears that improved fibre coverage is an important part of the effect. In addition, the effect is also believed to be related to the texture developed in the base sheet. This texture has been expressed as surface roughness and also as the coefficient of friction of the surface when the surface is rubbed against itself. Surface roughness can be measured by the Sheffield Smoothness Test and the frictional characteristics can be determined by the Mead Instron Slipperiness Test. This latter test measures the friction in grams developed when a sheet of test paper 5½" x 5" weighted down with a 1000 gram weight is pulled across a similar test sheet at the rate of 2" per minute. The following tabulation shows the differences that were observed using various pigments. The data included in the tabulation are for a base coated sheet on which 8 pounds of dry base coating has been applied per 3300 square feet to each side of the paper web.

| Pigment | Ave. particle size (μ) | Percent P.G. in Ctd. | [Coating [process | Surface smoothness | Instron slipperiness |
|---|---|---|---|---|---|
| Clays: | | | | | |
| Hydratex Clay | 0.8 | 66 | Roll | 85 | 330 |
| Do | 0.8 | 66 | Blade | 60 | 330 |
| Calcium carbonates: | | | | | |
| Camel Wite | 2.5 | 66 | Roll | 103 | 505 |
| Do | 2.5 | 66 | Blade | 65 | 460 |
| Other pigments: Magnesium-hydroxide. | 5.0 | 66 | do | 79 | 350 |

The data included in the foregoing tabulation clearly indicates that base coating compositions applied by roll coating means are generally rougher than base coats applied by blade coatings means. Coarser clay pigments in base coats applied by a blade coating means may actually result in a smoother base sheet but the slipperiness indicates that they have a rougher texture. In general, base coating compositions including calcium carbonate pigments are generally rougher than those containing clay pigments and, in addition, the coarser carbonate pigments are appreciably rougher. Also, experience indicates that the rougher base coated sheets are easier to top coat by blade coating means.

In general, coarse pigments should comprise at least about 15% of the total solids content of the base coating composition. The pigment portion may include up to 100% coarse pigments. Furthermore, in addition to the advantages noted heretofore, the invention provides additional economic advantages of high quality paper.

While various embodiments of the invention have been illustrated and described, it will be obvious to those skilled in the art that various changes and modifications may be made without departing from the invention and it is intended in the appended claims to cover all such changes and modifications that fall within the true spirit and scope of the invention.

What is claimed is:

1. In a process for preparing pigment coated papers, the steps which comprise applying to a paper base sheet a base coat composition comprising adhesive and pigment at least 15% by weight (based on total dry solids) of which have an average particle size about 2 microns average spherical diameter, drying said coated paper and thereafter applying to the said dried base coating a coating composition comprising essentially adhesive and pigment having an average particle size less than 2 microns average spherical diameter, and thereafter drying said coated paper.

2. The process of claim 1 wherein said base coating composition is applied by blade coating means.

3. The process of claim 1 wherein said first coating composition is applied by a roll coating means.

4. The process of claim 1 wherein said base coating composition comprises pigment particles both smaller than and greater than 2 microns average spherical diameter and at least 15% by weight (based on total dry solids) of said pigments having an average particle size above 2 microns average spherical diameter.

References Cited

UNITED STATES PATENTS

| | | | |
|---|---|---|---|
| 1,913,329 | 6/1933 | Bradner | 117—156 X |
| 2,395,992 | 3/1946 | Clark | 117—156 X |
| 2,685,571 | 8/1954 | Stinchfield et al. | 117—156 X |
| 2,949,382 | 8/1960 | Dickerman et al. | 117—83 X |
| 3,136,652 | 6/1964 | Bicknell. | |
| 3,152,918 | 10/1964 | Kraus | 117—156 X |
| 3,288,632 | 11/1966 | Rush et al. | 117—83 X |
| 3,362,845 | 1/1968 | Brundige | 117—156 X |

WILLIAM D. MARTIN, Primary Examiner

M. LUSIGNAN, Assistant Examiner

U.S. Cl. X.R.

106—288, 300, 306; 117—83, 86

UNITED STATES PATENT OFFICE
CERTIFICATE OF CORRECTION

Patent No. 3,468,698                      September 23, 1969

Andre Joseph Pelletier et al.

It is certified that error appears in the above identified patent and that said Letters Patent are hereby corrected as shown below:

Column 7, line 10, "about" should read -- above --.

Signed and sealed this 17th day of November 1970.

(SEAL)
Attest:

Edward M. Fletcher, Jr.                  WILLIAM E. SCHUYLER, JR.
Attesting Officer                         Commissioner of Patents